(12) United States Patent
Singh

(10) Patent No.: US 6,298,228 B1
(45) Date of Patent: Oct. 2, 2001

(54) LAZY UPDATES OF PROFILES IN A SYSTEM OF COMMUNICATION DEVICES

(75) Inventor: Munindar P. Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/191,095

(22) Filed: Nov. 12, 1998

(51) Int. Cl.[7] .................................................. H04B 7/00

(52) U.S. Cl. ............................................ 455/403; 455/519

(58) Field of Search .................................. 455/432, 433, 455/435, 519, 517, 88, 412, 414; 379/201, 211, 212

(56) References Cited

U.S. PATENT DOCUMENTS

| | | | |
|---|---|---|---|
| 4,953,159 | 8/1990 | Hayden et al. | 370/62 |
| 5,243,645 | 9/1993 | Bissell et al. | 379/211 |
| 5,317,683 | 5/1994 | Hager et al. | 395/145 |
| 5,434,994 | 7/1995 | Shaheen et al. | 395/500 |
| 5,511,232 | * 4/1996 | O'Dea et al. | 455/88 |
| 5,572,582 | 11/1996 | Riddle | 379/202 |
| 5,588,148 | 12/1996 | Landis et al. | 395/601 |
| 5,717,863 | 2/1998 | Adamson et al. | 395/200.34 |
| 5,724,648 | * 3/1998 | Shaughnessy et al. | 455/519 |
| 5,903,845 | * 5/1999 | Buhrmann et al. | 455/461 |

FOREIGN PATENT DOCUMENTS

WO 97/47120    12/1997  (WO) .............................. H04M/3/42

* cited by examiner

*Primary Examiner*—Vivian Chang
*Assistant Examiner*—Sam Bhattacharya
(74) *Attorney, Agent, or Firm*—Wood, Phillips, VanSanten, Clark & Mortimer

(57) ABSTRACT

Profiles in personal communication devices are updated by a method called lazy updates or demand-driven updates. In a lazy update, information is transmitted between users of personal communication devices and updates are performed only when the users communicate for other purposes. Users and service providers may update their profiles as often as they wish. Then, when a call or service request is initiated based on a given profile, the initiator of the call or service request ensures that the profile that is being used is sufficiently up-to-date for the present purpose and, if it is not, updates the profile. Lazy updates can occur when communication occurs for reasons other than solely updating the information. Examples of such updates include modification of a user's schedule or changes in the services that a service provider offers. Updates that affect future communication, such as changes in address information, telephone numbers or email addresses, happen much less frequently. However, updates such as these must occur at the time the update occurs, rather at some indefinite time in the future. Such updates are typically sent to certain designated key recipients, such as to individuals in frequent contact with the user or to selected services providers.

21 Claims, 2 Drawing Sheets

LAZY UPDATES OF PROFILES IN A SYSTEM OF COMMUNICATION DEVICES

BACKGROUND

1. Field of the Invention

This invention relates generally to communications devices and particularly to personal communication devices that maintain profiles of individuals.

2. Related Art

Personal communication devices combine the features of computers and telephones to allow powerful interactions among users. The interactions among users can be solely for communication or for business purposes such as electronic commerce. Optimally, a personal communication device should assist the user in finding and contacting persons and services while also ensuring that the user is contacted, via the personal communication device, only by persons and service providers with whom the user wishes to interact. To accomplish these two goals, some personal communication devices store and utilize profiles of the user and of all other persons or service providers with whom the user interacts.

A profile is information about each user or service provider that is stored in personal communication devices. Profiles enable the personal communication device to determine when and with whom to interact, as well as what requests or offers to make to persons or service providers. Profiles include information such as the addresses at which an entity may be contacted, the times at which different addresses are preferred, and the services that are being offered by the entity. Thus, profiles can be used directly by the user, or the personal communication device can be automated to utilize the profiles to make the above decisions.

Out-of-date profiles lead to erroneous decisions by both the user and the personal communication device. Therefore, it is important to ensure that profiles are kept up-to-date. However, as the number and complexity of profiles used by a single personal communication device increases, the need for a reliable system to keep such profiles up-to-date also increases. The system to keep profiles up-to-date should not put onerous demands on the user or require excessive or unnecessary communication between personal communication devices because personal communication devices may often be disconnected from other personal communication devices or be connected only via expensive or limited bandwidth cellular services.

In the past, profiles have been updated by having the personal communication device keep a log of all persons and/or service providers who have received the user's profile. Then, whenever the user's profile is updated, it is automatically sent to all previous recipients. Each recipient's personal communication device then queries the recipient to determine whether the recipient would like to update the profile. If the recipient approves, the new profile is installed on the recipient's personal communication device.

The prior method of updating user profiles generates a great deal of communication traffic whenever a profile is updated because the profile is automatically sent to every person and service provided who had previously received the profile. The user who forwards the updated profile incurs the cost of this communication. Quite often, this extensive communication is unnecessary because the user whose profile is being updated may no longer have any communication with certain persons or service providers to whom the user had previously sent a profile. Also, the user's dealings with certain other persons and service providers may occur sporadically, such that keeping the user's profile up-to-date is unnecessary. For example, the user may deal with a real estate broker only when the user buys or sells property in the agent's area, and therefore, it is not necessary to continually update profiles between the user and the real estate agent.

Furthermore, before a profile is updated on a recipient's personal communication device, the recipient is asked to approve the update. This causes interruptions to the recipient forcing him or her to decide whether to receive the updated profile. If the user of a personal communication device has a large number of profiles stored in the personal communication device, such interruptions may become so numerous as to constitute a nuisance. Furthermore, if certain persons or service providers do not accept updated profiles, multiple versions of a single user's profile will exist, potentially resulting in unsuitable behavior of the personal communication device.

SUMMARY OF THE PRESENTLY PREFERRED EMBODIMENT

In a preferred embodiment of the present invention, the updating of profiles in personal communication devices is accomplished by a method called lazy updates or demand-driven updates. In a lazy update, information is transmitted between users of personal communication devices and updates are performed only when the users communicate for other purposes. Users and service providers may update their profiles as often as they wish. The information contained in profiles may be forwarded in any of the same ways that information is transferred between computers or other electronic devices. These methods are well-known in the art. However, when a call or service request is initiated based on a given profile, the initiator of the call or service request ensures that the profile that is being used is sufficiently up-to-date for the present purpose and, if it is not, updates the profile.

Lazy updates can be utilized because most updates to profiles pertain to information that is not critical to future correspondence with other users or services providers. Therefore, these type of updates can occur when communication occurs for reasons other than solely updating the information. Examples of such updates include modification of a user's schedule or changes in the services that a service provider offers. Updates that affect future communication, such as changes in address information, telephone numbers or email addresses, happen much less frequently. However, updates such as these must occur at the time the update occurs, rather at some indefinite time in the future. Such updates are typically sent to certain designated key recipients, such as to individuals in frequent contact with the user or to selected services providers, such as directory providers.

Utilizing a lazy update approach allows a network of personal communication devices to maintain up-to-date information on the various users of the system without a great deal of communication traffic when a profile is updated. Furthermore, it is not necessary to keep a large number of profiles fully up-to-date for individuals or service providers that the user is not in frequent contact with. Therefore, the profiles of these sporadically contacted individuals or service providers are updated only when they are actually contacted.

These and other features and advantages of the invention will be apparent upon consideration of the following detailed description of the preferred embodiments of the invention, taken in conjunction with the appended drawings.

DETAILED DESCRIPTION OF THE PRESENTLY PREFERRED EMBODIMENTS

In the presently preferred embodiment of the present invention, profiles in personal communication devices are updated by a method called lazy updates or demand-driven updates. A profile is information about each user and/or service provider that is stored in personal communication devices. Profiles enable the personal communication device to determine when and with whom to interact, as well as what requests or offers to make to persons or service providers. Profiles include information such as the addresses at which an entity may be contacted, the times at which different addresses are preferred, and the services that are being offered by the entity. Each profile has a field associated with it that contains a verified date (the last date that the profile was verified as being up-to-date) as well as the version number of the profile.

Profiles must be updated from time to time. In the preferred embodiment, the updates are performed over telephone lines in the same manner that computers communicate. This type of communication is well known in the art. In an alternate embodiment, the updates are performed via cellular communication, such as that used by cellular telephones. It is also possible that updated profile information may be transmitted via any other method that information is transmitted, such as via optical signals or radio frequency communication.

In the preferred embodiment, the updates are performed in two different methods, depending on what information is being updated. The first type of update is called an automatic update and occurs when communication information changes that affects future communication, such as changes in address information, telephone numbers or email addresses. Updates such as these must be communicated to other user or service providers at the time the updated communication information is entered, rather at some indefinite time in the future because future communications may fail if these updates are not transmitted. Such updates are typically sent to certain designated key recipients, such as individuals in frequent contact with the user or selected services providers. The second type of update is when schedule information is updated that is not critical to future communication with other users or services providers. This type of update does not have to occur simultaneous with the actual update of the schedule information because future communications can still occur even if schedule information has not been updated. Therefore, this type of update can occur when communication occurs for reasons other than solely updating the information. This is called a lazy update or a demand-driven update. Lazy updates can be performed each time a call is received or placed by a personal communication device. Examples of lazy updates of schedule information include modification of a user's schedule or changes in the services that a service provider offers.

Figure 1:
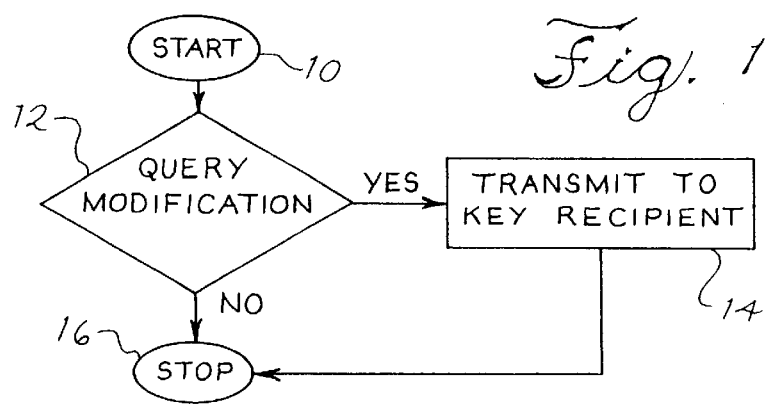
FIG. 1 is a flow chart of an automatic update of communication information in a preferred embodiment of the present invention.

Referring now to FIG. 1, a flow chart of an automatic update of communication information in a preferred embodiment of the present invention is shown. The automatic update starts at the start step 10. For each designated key recipient of communication information, the personal communicator determines if communication information has been updated in the query modification step 12. If the user's communication information has been updated, the updated communication information is automatically transmitted to the key recipient in the transmit to key recipient step 14. Included in the updated communication information transmitted to the key recipient is the field containing the verified date and the version number of the profile. After the updated communication information is transmitted in the transmit to key recipient step 14, the automatic update stops at the stop step 16. If, at the query modification step 12, the personal communicator determines that the user's communication information has not been updated, the automatic update stops at the stop step 16. This entire process is then repeated for each designated key recipient.

Figure 2:
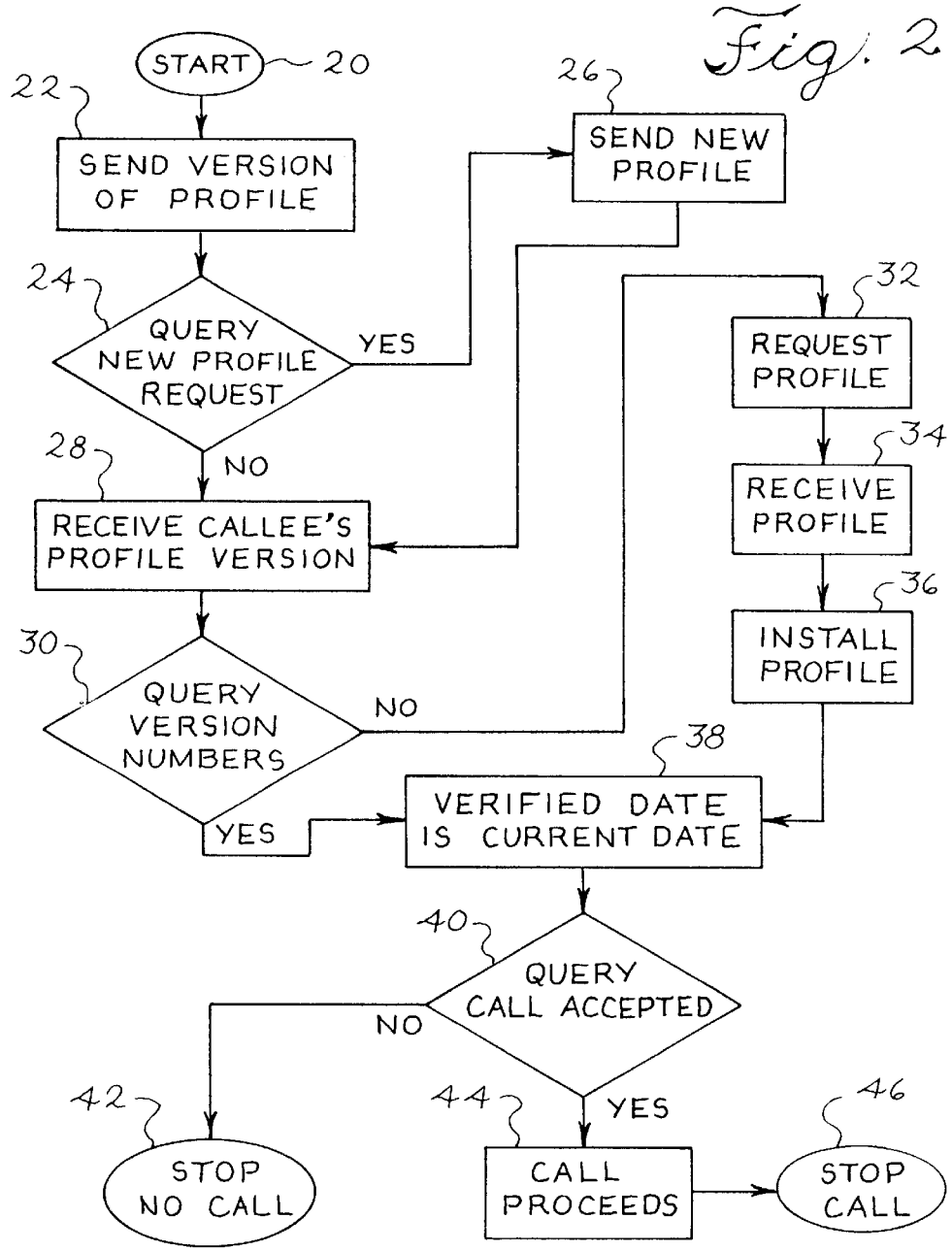
FIG. 2 is a flow chart of a lazy update of schedule information in a preferred embodiment of the present invention.

Lazy updates of schedule information may occur each time a call is placed or received by a personal communication device. Referring now to FIG. 2, a flow chart of a lazy update of schedule information during the placement of a call by the user is shown. The process begins at the start step 20 when the call is placed. The personal communication device that is making the call sends the latest version number of the user's profile at the send version of profile step 22.

The personal communication device then queries the callee to determine if the callee has requested an updated profile of the user at the query new profile request step 24. If the callee has requested an updated profile from the user, the personal communication device will send a new profile at the send new profile step 26. After the personal communication device has sent the new profile, it receives the callee's current profile version number at the receive callee's profile version step 28. In the alternative, if the callee has not requested an updated profile from the user at the query new profile request step 24, the personal communication device will then proceed directly to the receive callee's profile version step 28.

The personal communication device then compares the current version number of the callee's profile received at the receive profile version step 28 with the stored version number of the profile for the callee at the query version numbers step 30. If the current version number matches the stored version number of the profile for the callee, the personal communication device sets the verified date to the current date in the verified date is current date step 38. If the current version number of the callee's profile does not match the stored version number, the personal communication device request a new profile at the request profile step 32, receives the new profile at the receive profile step 34 and installs the new profile at the install profile step 36. After the personal communication device installs the new profile at the install profile step 36, it then sets the verified date to the current date in the verified date is current date step 38.

After all of the above steps have taken place, the callee is then queried as to whether it accepts the call from the user at the query call accepted step 40. At this time, the callee can refuse to accept the call and the call will end at the stop no call step 42. In the alternative, the callee can accept the call and the call will proceed at the call proceeds step 44. The call may be a voice telephone call or a data call wherein devices exchange information or any number of other types of communication between two entities. When the call then ends, the personal communication device proceeds to the stop call step 46 and awaits the next placement or receipt of a call or the next update of the user's profile.

Figure 3:
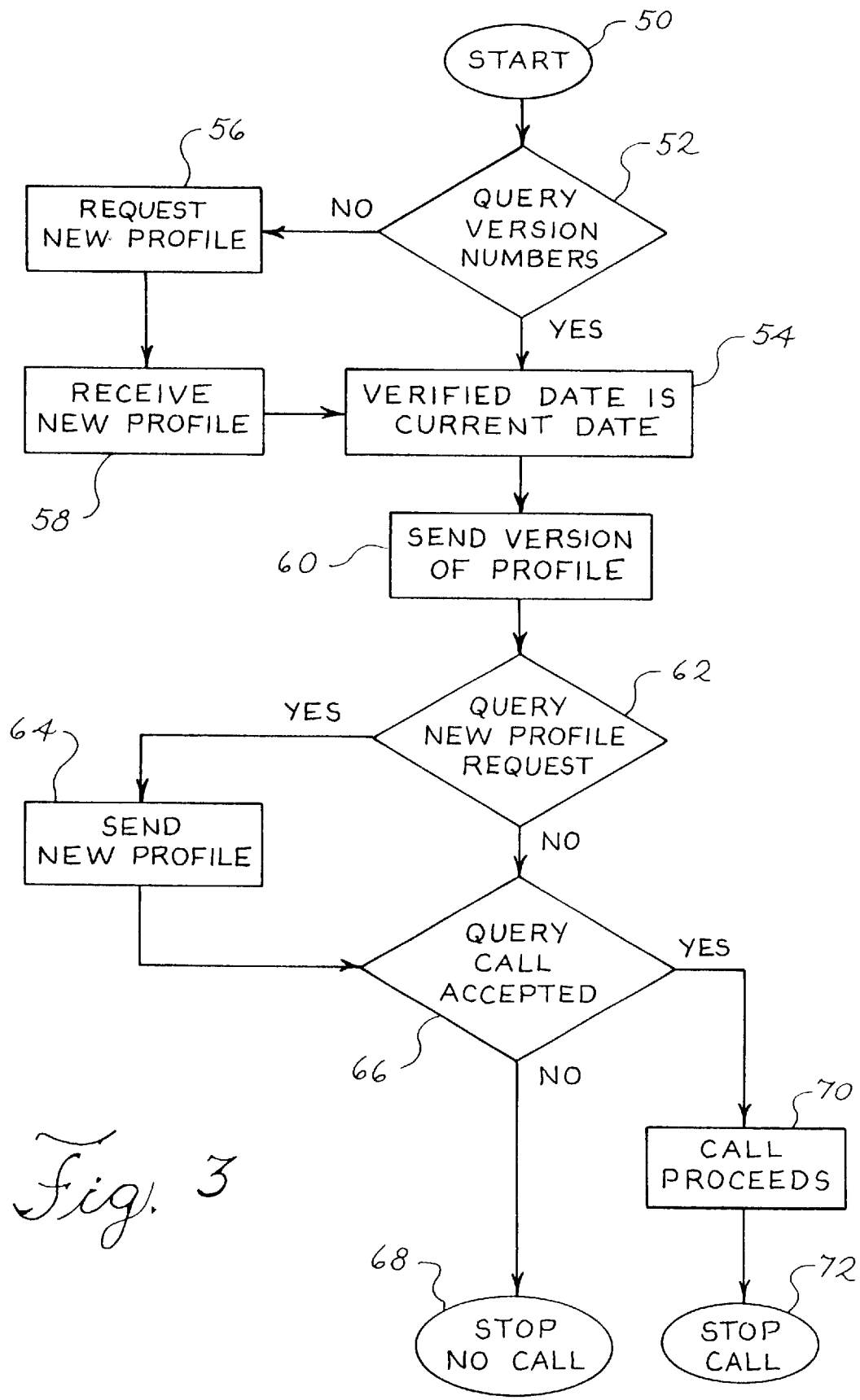
FIG. 3 is a flow chart of a lazy update of schedule information in a preferred embodiment of the present invention.

Referring now to FIG. 3, a flow chart of a lazy update of schedule information during the receipt of a call by the user is shown. The process begins at the start step 50 when the call is received. The personal communication device receiving the call compares the current version number of the caller's profile sent by the caller at the beginning of the call (send version of profile step 22 in FIG. 2) with the version number of the stored caller's profile at the query version numbers step 52. If the current version number of the callers' profile matches the stored version number of the caller's profile, the personal communication device sets the verified date to the current date in the verified date is current date step 54. If the current version number of the callers' profile does not match the stored version number, the personal communication device requests a new profile at the request new profile step 56 and receives the new profile at the receive new profile step 58. After the personal communication device receives the new profile at the receive new profile step 58, it then sets the verified date to the current date in the verified date is current date step 54.

After the verified date is current date step 54, the personal communication device sends the current version of the user's profile to the caller at the send version of profile step 60. This current version is received by the calling personal communication device at the receive callee's profile version step 28 shown in FIG. 2. At the query new profile request step 62, the personal communication device then queries the caller to determine if the caller has requested a new profile in the request profile step 32 shown in FIG. 2. If the caller has requested a new profile, the personal communication device will send a new profile to the caller at the send new profile step 64.

The personal communication device will then be queried as to whether the call is accepted at the query call accepted step 66. In the alternative, if the caller has not requested a new profile from the callee, the personal communication device will be queried as to whether the call is accepted at the query call accepted step 66 immediately after the query new profile request step 62. If the call is not accepted, the call ends at the stop no call step 68. If the call is accepted, the call proceeds at the call proceeds step 70 before eventually ending at the stop call step 72. At this point, the personal communication device awaits the next placement or receipt of a call or the next update of the user's profile.

In either of the lazy update methods shown in FIGS. 2 and 3, the call may be declined by the callee. However, information about the current versions of the profile of the callee and caller is exchanged, and updated profiles are exchanged as needed, even if the call is not accepted by the callee. This ensures that profiles are updated even if a call is not accepted to facilitate future communication between the individuals and/or service providers involved in the call. If, however, the callee determines that he or she will never accept any communication from the caller, the personal communication device can be programmed so that calls from that particular caller will never be accepted and the entire procedure of lazy updates is not performed.

In the verified date is current date step 38 in FIG. 2 and the verified date is current date step 54 in FIG. 3 the latest date that the profile for any given person or service provider has been verified as up-to-date is stored. This date can be used to determine how reliable the information in the profile is. At some age, a profile is considered decayed. A simple technique for this is to program the personal communication device to treat all profiles with their verified date a certain age, such as one month, as decayed.

Decayed profiles have two main ramifications in a personal communication device. The first is that if a profile is decayed, the personal communication device will try to revive it before using that profile to initiate a call by, for example, making a special call to validate the card. This results in an updated verified date, with either the same version profile or a new version profile installed in the personal communication device. The second is that if the profile of an individual or a service provider is decayed, that may mean that the individuals or service provider is not among the user's close collaborators. Thus, when the user's communication information changes, the automatic updates need not be sent to the individuals or service providers with decayed profiles. Instead, the user is allowed to decide whether to send updated communication information to individuals or service providers having decayed profiles. A further advantage of identifying decayed profiles is that an updated profile can be sent to any individual or service provider for whom the user has a decayed profile because, if that entity's profile is decayed, then it is likely that the user's profile that the entity has would not be up-to-date.

In the above described preferred embodiment, updates are performed in the context of telephone calls. This is merely for descriptive purposes and is not intended to be a limitation. Updates could also be performed in any manner of communication including, for example, as sending or receiving a facsimile or electronic mail.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A method of updating a personal communication device adapted to communicate selected information with other communication devices, comprising:

providing a profile of a first user having information about the first user different than said selected information;

updating the information in the profile of the first user;

transmitting the updated information in the profile of the first user to a second user automatically when the first user initiates communication of said selected information with the second user or when the second user initiates communication of said selected information with the first user;

providing a profile of the second user having information about the second user different than said selected information;

updating the information in the profile of the second user;

transmitting the updated information in the profile of the second user when the updated information in the profile of the first user is transmitted.

2. The method of claim 1 wherein the profile of the first user includes a version number and the profile of the second user includes a version number.

3. A method of updating a personal communication device comprising:

providing a profile of a first user having information about the first user, said profile of the first user including a version number;

updating the information in the profile of the first user;

transmitting the updated information in the profile of the first user to a second user automatically when the first user initiates communication with the second user or when the second user initiates communication with the first user, wherein the step of transmitting the updated information in the profile of the first user to a second user automatically when the first user initiates communication with the second user further comprises:

querying the second user to determine whether a new profile of the first user has been requested;

sending a new profile of the first user if a new profile of the first user has been requested by the second user;

providing a profile of the second user having information about the second user, the profile of the second user including a version number;

updating the information in the profile of the second user;

transmitting the updated information in the profile of the second user when the updated information in the profile of the first user is transmitted.

4. The method of claim 3 wherein the step of transmitting the updated information in the profile of the first user to a second user automatically when the first user initiates communication with the second user further comprises:

receiving the version number of the profile of the first user last transmitted to the second user if a new profile has not been requested;

comparing the version number of the profile of the first user last transmitted to the second user with the version number of the current profile of the first user;

transmitting an updated profile of the first user if the version number of the profile of the first user last transmitted to the second user is not the same as the version number of the current profile of the first user; and updating a verified date field.

5. The method of claim 4 further comprising querying the second user to determine whether the call is accepted.

6. A method of updating a personal communication device comprising:

providing a profile of a first user having information about the first user, said profile of the first user including a version number;

updating the information in the profile of the first user;

transmitting the updated information in the profile of the first user to a second user automatically when the first user initiates communication with the second user or when the second user initiates communication with the first user;

providing a profile of the second user having information about the second user, the profile of the second user including a version number;

updating the information in the profile of the second user;

transmitting the updated information in the profile of the second user when the updated information in the profile of the first user is transmitted comprising:

transmitting the version number of the current profile of the second user to the first user;

querying the first user to determine whether a new profile of the second user has been requested; and sending a new profile of the second user if a new profile of the second user has been requested by the first user.

7. The method of claim 6 further comprising querying the second user to determine whether the call is accepted.

8. A system of personal communication devices comprising:

a user of a personal communication device having a profile;

one or more individuals each using a personal communication device and each having a profile; and one or more service providers each having a profile;

wherein the profile of the user is transmitted individually to each of the one or more individuals and one or more service providers when the user initiates communication with an individual or service provider or when an individual or service provider initiates communication with the user; and the profiles of each of the one or more individuals and one or more service providers are transmitted individually to the user when the user initiates communication with an individual or service provider or when an individual or service provider initiates communication with the user.

9. The invention of claim 8 wherein the profile of the user includes a version number and each of the profiles of the one or more individuals and one or more service providers has a version number.

10. The invention of claim 9 wherein the profile of the user is transmitted individually to each of the one or more individuals and one or more service providers when the version of the current profile of the user is different from the version of the profile of the user previously transmitted to an individual or service provider.

11. The invention of claim 9 wherein the profiles of each of the individuals and service providers are transmitted individually to the user when the version of the current profile of each individual and service provider is different from the version of the profile of each individual and service provider previously transmitted to the user.

12. A method of updating profiles stored in personal communication devices wherein a profile of the first user having information about the first user and a profile of the second user having information about the second user are stored in the personal communication devices and said information in said profiles are updated from time to time, said personal communication devices being adapted to selectively communicate selected information with one another different from said profile information, comprising:

transmitting, from the personal communication device of the first user to the personal communication device of the second user, the updated information in the profile of the first user to the personal communication device of the second user automatically when the personal communication device of the first user initiates communication of the selected information with the personal communication device of the second user or when the personal communication device of the second user initiates communication of the selected information with the personal communication device of the first user;

transmitting, from the personal communication device of the second user, the updated information in the profile of the second user when the updated information in the profile of the first user is transmitted by the personal communication device of the first user.

13. The method of claim 12 wherein the profile of the first user includes a version number and the profile of the second user includes a version number.

14. The method of claim 13 wherein the step of transmitting the updated information in the profile of the first user to the personal communication device of a second user automatically when the first user initiates communication with the personal communication device of the second user further comprises:

querying the personal communication device of the second user to determine whether a new profile of the first user has been requested;

sending a new profile of the first user if a new profile of the first user has been requested by the personal communication device of the second user.

15. The method of claim 14 wherein the step of transmitting the updated information in the profile of the first user to the personal communication device of a second user automatically when the first user initiates communication with the personal communication device of the second user further comprises:

receiving the version number of the profile of the first user last transmitted to the personal communication device of the second user if a new profile has not been requested;

comparing the version number of the profile of the first user last transmitted to the personal communication device of the second user with the version number of the current profile of the first user;

transmitting an updated profile of the first user if the version number of the profile of the first user last transmitted to the personal communication device of the second user is not the same as the version number of the current profile of the first user; and updating a verified date field.

16. The method of claim 15 further comprising querying the personal communication device of the second user to determine whether the call is accepted.

17. The method of claim 13 wherein the step of transmitting the updated information in the profile of the second user further comprises:

transmitting the version number of the current profile of the second user to the personal communication device of the first user;

querying the personal communication device of the first user to determine whether a new profile of the second user has been requested;

sending a new profile of the personal communication device of the second user if a new profile of the second user has been requested by the personal communication device of the first user.

18. The method of claim 17 further comprising querying the personal communication device of the second user to determine whether the call is accepted.

19. A system of personal communication devices adapted to communicate with each other and a service provider, comprising a plurality of personal communication devices each having a user and storing profiles of the users and a profile of a service provider, wherein:

one of the personal communication devices is adapted to transmit the profile of the user of said one personal communication device to another of said personal communication devices or said service provider when initiating communication with said another of said personal communication devices or said service provider or when said another of said personal communication devices or said service provider initiates communication with the one personal communication device, and said another of said personal communication devices or said service provider is adapted to transmit the profile of said user of said another of said personal communication devices or said service provider to said one of said personal communication devices when said one of said personal communication devices initiates communication with said another of said personal communication devices or said service provider or when said another of said personal communication devices or service provider initiates communication with the one personal communication device.

20. The system of claim 19 wherein each of the profiles is adapted to include a version number.

21. The system of claim 20 wherein said one personal communication device is adapted to transmit the profile of the user of said one personal communication device individually by initiating contact with each of said another of said personal communication devices and said service provider when the version of the current profile of the user is different from the version of the profile of the user previously transmitted to any of said another of said personal communication devices or service provider.

* * * * *